Dec. 1, 1964   R. L. DE LAIN   3,159,179
PLUGS WITH DIAPHRAGM FLOW CONTROL DEVICE
Filed Sept. 20, 1962   4 Sheets-Sheet 1
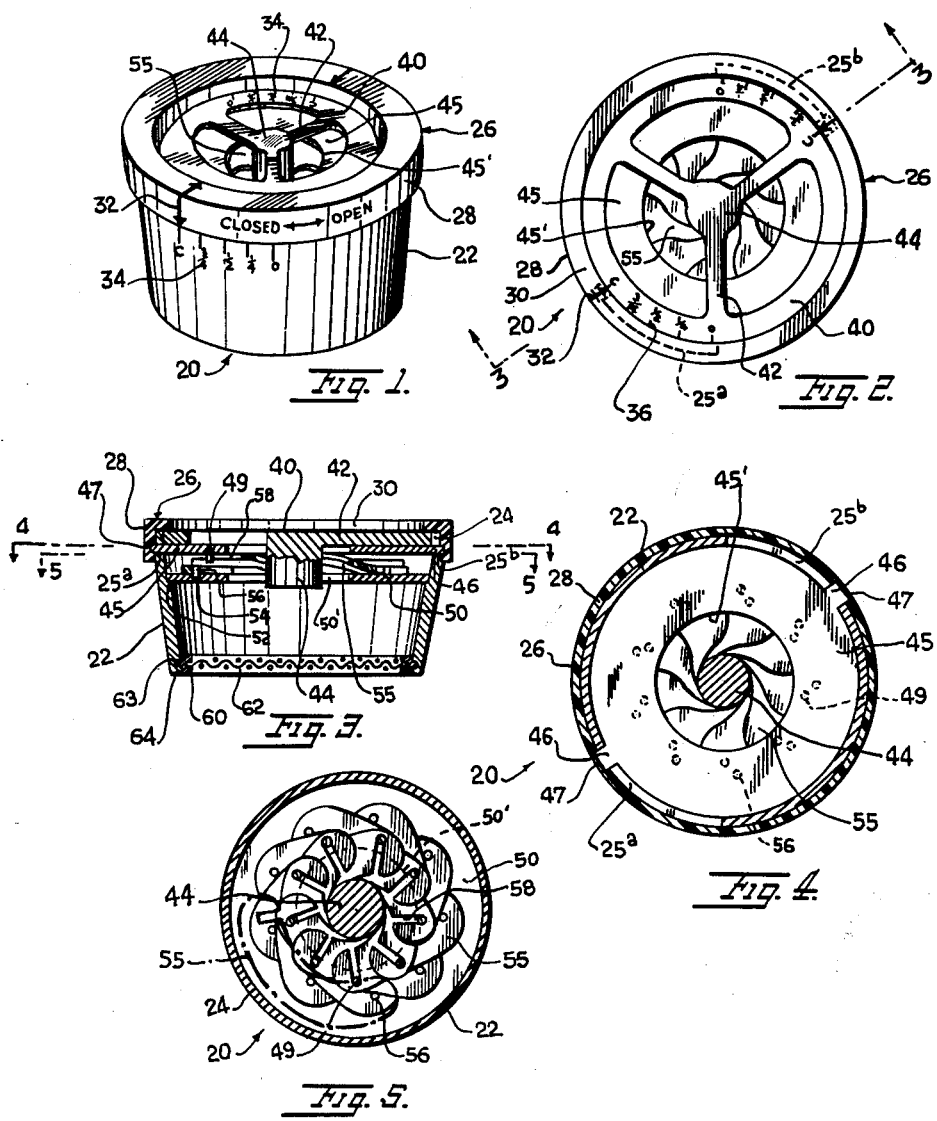
INVENTOR.
ROBERT L. DE LAIN
BY
ATTORNEY Dec. 1, 1964  R. L. DE LAIN  3,159,179
PLUGS WITH DIAPHRAGM FLOW CONTROL DEVICE
Filed Sept. 20, 1962  4 Sheets-Sheet 2

INVENTOR.
ROBERT L. DE LAIN
BY
ATTORNEY

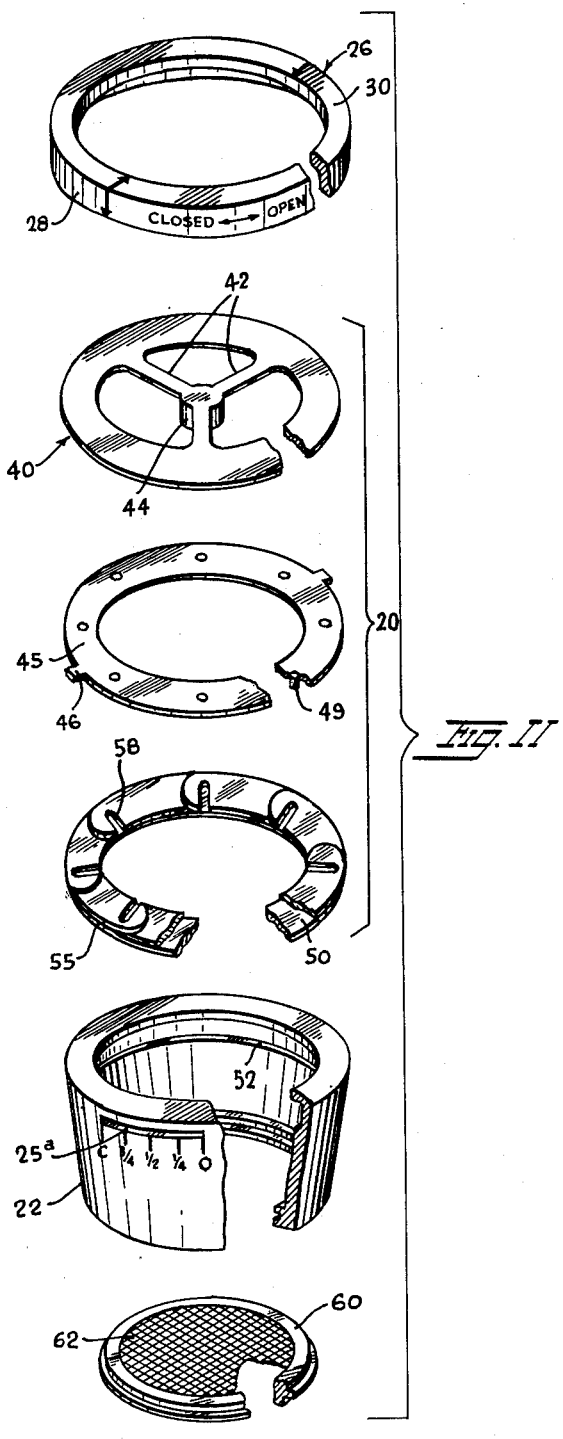

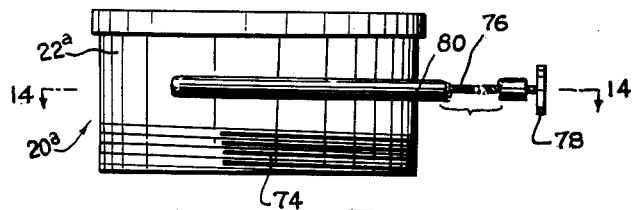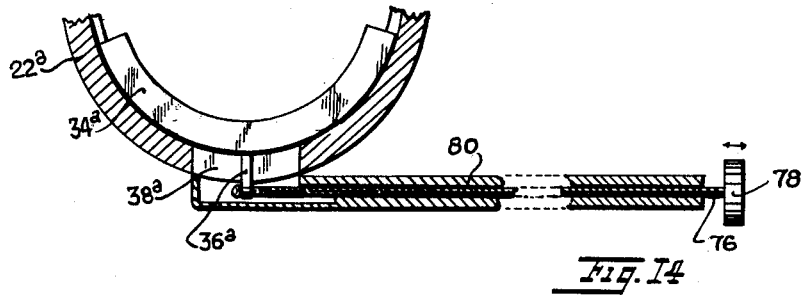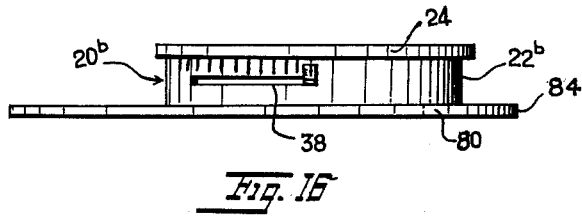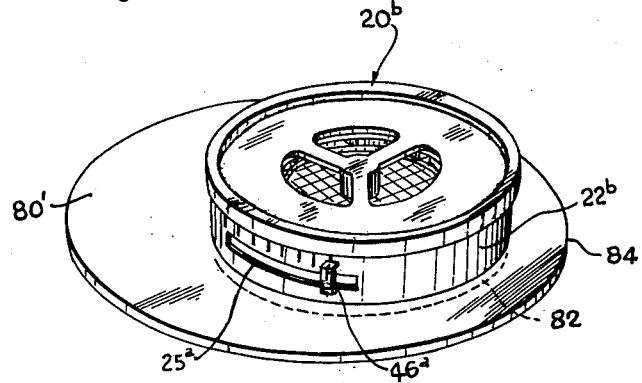

United States Patent Office 3,159,179
Patented Dec. 1, 1964

3,159,179
PLUGS WITH DIAPHRAGM FLOW CONTROL DEVICE
Robert L. De Lain, 169—10 107th Ave., Jamaica, N.Y.
Filed Sept. 20, 1962, Ser. No. 225,057
3 Claims. (Cl. 137—545)

This invention concerns an improved iris type fluid flow control device.

According to the invention there is provided a fluid flow control device including a frame structure in which is an iris type shutter. The device can be interposed in a duct system to control flow of air, gaseous products of combustion or other gases. The frame structure can be installed in drain openings, hoses, carburetors, flush tanks and other apparatus having a passage through which liquid flows for adjustably varying the size of the passage. The device can be provided with a timing device to open and close it at predetermined time intervals. A remote control cable can be connected to the device to operate it by remote control. Suitable locking means can be provided to lock the device in any desired setting. The device may have an index and scale for indicating the size of the opening therethrough at any setting of its shutter. The device is one of general application in the fluid flow control art.

It is therefore a principal object of the invention to provide a fluid flow control device including an iris type shutter which can be adjustably set to vary the size of an opening therethrough.

Another object is to provide a fluid control device of general application for adjustably controlling flow of liquids or gases.

A further object is to provide a device of the character described having a simplified structure, which is inexpensive to manufacture; which is positive and foolproof in operation; which can be easily installed and removed; which is durable and has a long useful life.

For further comprehension of the invention, and of the objects and advantages thereof, references will be had to the following description and accompanying drawings, and to the appended claims in which the various novel features of the invention are more particularly set forth.

In the accompanying drawings forming a material part of this disclosure:

FIG. 1 is a perspective view of a device embodying the invention.

FIG. 2 is a top plan view of the device.

FIG. 3 is a sectional view taken on line 3—3 of FIG. 2.

FIG. 4 and FIG. 5 are sectional views taken on lines 4—4 and 5—5, respectively, of FIG. 3, showing the shutter in closed position.

FIG. 11 is an exploded perspective view of the device of FIG. 1, parts being broken away.

FIG. 13 is a side elevational view of a device embodying a further modified form of the invention, parts being broken away.

FIG. 14 is a fragmentary cross-sectional view taken on the plane of the line 14—14 of FIG. 13.

FIG. 15 is a top perspective view of a device embodying a still further modified form of the invention.

FIG. 16 is a side elevational view of the device of FIG. 15.

Figure 6:
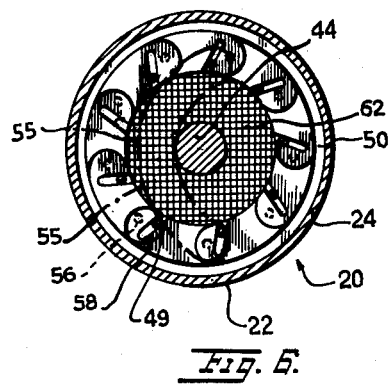
FIG. 6 is a sectional view similar to FIG. 4 showing the shutter in open position.
Figure 7:
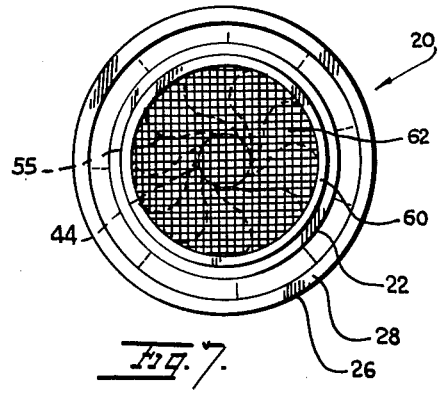
FIG. 7 is a bottom plan view of the device.
Figure 8:
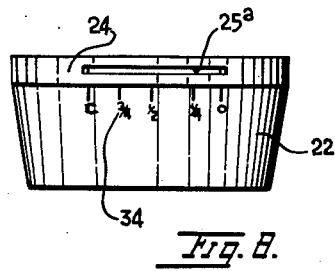
FIG. 8 is a side elevational view of a casing employed in the device.

Referring to the drawings, there is shown a fluid flow control device or valve structure 20 including a tapered, tubular casing 22 open at both its wider and narrower end. The casing has an upper narrow cylindrical wall portion 24 provided with diametrically opposed slots 25$^a$, 25$^b$ extending circumferentially.

Over and around the wall portion 24 fits a flanged ring 26. This ring has a peripheral, cylindrical depending skirt 28 and an annular flange 30 extending radially inward from skirt 28. The ring is marked with index arrows 32 which point to scale marks 34 on the tapered casing wall. The arrows also point to scale marks 36 on an annular portion of a spider ring 40. The ring 40 has angularly spaced radial arms 42 joined at the center of the ring by a cylindrical plug 44 which extends axially inward of the casing.

Figure 10:
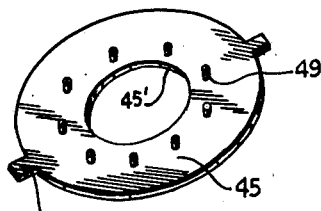
FIG. 10 is a perspective view of a shutter actuator ring.

Just below ring 40 is a shutter actuator ring 45. This ring is a flat annular member shown to best advantage in FIG. 10. It has two diametrically opposed outwardly projecting tabs or fingers 46 which pass through the slots 25$^a$, 25$^b$ of the casing and engage in recesses 47 formed on the inner side of skirt 28; see FIG. 3 and FIG. 4. Thus, when the ring 26 is turned, the ring 45 turns with it, while spider ring 40 is held stationary by its tight frictional fit in the casing. Ring 45 carries a plurality of equally spaced pins 49 on one side.

Figure 9:
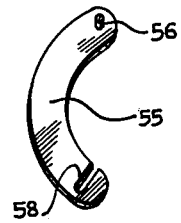
FIG. 9 is a perspective view of a shutter leaf or vane.

A stationary flat annular ring 50 is mounted in a shoulder 52 inside the casing. Ring 50 has a plurality of equally spaced recesses 54. Between rings 45 and 50 is a plurality of flat arcuate leaves or vanes 55 shown to best advantage in FIGS. 5, 6 and 9. Each of these leaves has a pin 56 extending outwardly of one side near one end thereof. At the other end of each leaf is a slot 58. Pins 56 of the leaves are rotatably engaged in recesses 54 respectively of ring 50. Pins 49 of ring 45 are slidably engaged in slots 58 of the leaves respectively. The leaves are disposed in overlapping fashion all around the central plug 44, to define an iris type shutter. The leaves may be made of rigid or flexible material.

FIGS. 2–4 show the shutter in closed position. The leaves are disposed in inwardly rotated positions with their inner edges abutting the plug to form a tightly sealed barrier or partition across the casing between the openings 45' and 50' in the rings. FIG. 6 shows the leaves in outwardly rotated position abutting the inner side of the casing to define a large opening substantially equal to the size of aligned openings 45', 50'. When the valve is in partly open position, the leaves and radial arms 42 of the spider ring 40 serve to screen out large objects.

To effect opening and closing of the shutter leaves, the ring 45 is rotated clockwise or counterclockwise respectively as viewed in FIGS. 1–6. To rotate the ring, the outer ring 26 is manually grasped and turned while the casing 22 is held stationary. The size of the opening ranging from fully open to fully closed is indicated by the markings "O" and "C" and the fractional markings "¼", "½" and "¾" on the scales 34, 36. The tabs 46 serve as handles to turn ring 45 as ring 26 is turned. Pins 49 slide in slots 58 as ring 45 rotates and leaves 55 turn on pins 56.

At its narrow open end, the casing carries a stationary ring 60 across which is mounted a filter screen 62. The ring 60 has an outer rib 63 which engages in a groove 64 formed on the inner side of the casing.

The device described may serve as a stopper in a drain of a sink or tub. When made in a larger size it can serve as an adjustable stopper for a sewer drain. Use of this device is not limited to sinks or drains. The device can be provided with suitable threads, nipples or fittings of various shapes and sizes to be connected into any type of conduit system. It can be made in a large size and installed in an air conditioning system to control flow of heated or cooled air. It can be installed in a furnace to control flow of flue gases. It can be provided with means to lock the ring 26 in any set position. A flexible cable can be connected to the ring for turning from a remote point. This flexible cable can be manually or electrically operated. The ring 26 can be operated by electromechanical timing means directly connected to the ring or to the control cable. Other variations will readily occur to those skilled in the art.

Figure 12:
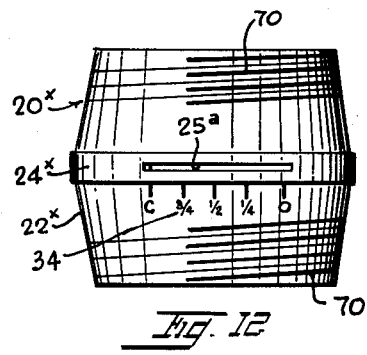
FIG. 12 is a side elevational view of a device embodying a modified form of the invention.

In FIG. 12, a modified form of fluid flow control device 20ˣ is illustrated having an elongated tubular casing 22ˣ with a body tapering inwardly from both ends toward a ring or annular member 24ˣ midway the ends thereof. At both ends, the body of the casing is formed with external screw threads 70 for securing the casing to the end of a hose, pipe or other fluid discharging conduit.

In all other respects including function and operation, the device 20ˣ is similar to the device 20 and similar reference numerals are used to indicate similar parts.

In FIGS. 13 and 14, the modified form of fluid flow control device or valve structure 20ᵃ comprises a casing 22ᵃ threaded externally at 74 near its lower end for securing to the end of a hose, pipe or other fluid discharging conduit. Alternatively, the casing could be internally threaded for the same purpose. Finger 36ᵃ extends radially outwardly of ring 34ᵃ through slot 38ᵃ in casing 22ᵃ and is engaged at the end of a flexible cable 76. The cable terminates at a remote point in a handle 78. A casing or conduit 80 is joined tangentially to the casing 22ᵃ at the slot 38ᵃ. This structure permits the valve to be opened and closed from a remote point.

In all other respects, the valve structure 20ᵃ is similar to the valve structure 20 and similar references are used to indicate similar parts.

In FIGS. 15 and 16, another modified form of fluid flow control device or valve structure 20ᵇ is shown wherein an annular or ringlike pad 80' surrounds the bottom open end 82 of the casing 22ᵇ. The pad serves as a base or support for the casing and can be placed in a sink around the usual drain opening. The pressure of the water flowing over the pad will seal the pad to the surface of the sink or bathtub. The valve structure is shown mounted eccentrically of the pad, near the narrow edge 84 of the pad so that the valve structure can be used in a bathtub, sink or other fixture wherein the drain opening is located close to a wall of the fixture.

In all other respects, the valve structure 20ᵇ is similar to the valve structure 20 and similar reference numerals are used to indicate similar parts.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A valve structure for controlling flow of liquids or gases therethrough, comprising a cylindrical casing, open at opposite ends to define a passage therethrough, first and second flat annular rings disposed in said casing in axial alignment therewith, a plurality of arcuate leaves disposed between the rings in overlapping fashion to form an annular partition, said leaves each having one end thereof pivotally engaged with the first ring, each of the leaves having a slotted other end, said second ring having a plurality of pins slidably engaged in the slots in the leaves, said first ring being held stationary in the casing while the other ring is rotatable, a spider ring mounted in the casing, said spider ring having a flat annular portion engaged with the casing, said leaves serving as a coarse strainer, a plurality of arms extending radially inward of said flat annular portion, and a central plug at the inner ends of the arms, said plug extending axially inward of the casing past the leaves whereby inner edges of the leaves engage the plug when the leaves are pivoted inwardly to close the passage through the casing, another ring on the exterior of the casing connected to the second ring for rotating the same to pivot the leaves for opening and closing the same, said casing and other ring having cooperating scale markings thereon for indicating the size of the passage through the casing defined by the leaves in each position thereof, and a filter screen at the other end of the casing extending thereacross to filter liquids or gases passing through the casing.

2. A valve structure for controlling flow of liquids or gases therethrough, comprising a casing, open at opposite end to define a passage therethrough, said casing having circumferential opposed closed slots, first and second flat annular rings disposed in said casing in axial alignment therewith, a plurality of arcuate leaves disposed between the rings in overlapping fashion to form an annular partition, said leaves each having one end thereof pivotally engaged with the first ring, each of the leaves having a slotted other end, said second ring having a plurality of pins slidably engaged in the slots in the leaves, said first ring being held stationary in the casing while the other ring is rotatable, a spider ring mounted in the casing, said spider ring having a flat annular portion engaged with the casing, a plurality of arms extending radially inward of said flat annular portion, a central plug at the inner ends of the arms, said plug extending axially inward of the casing past the leaves whereby inner edges of the leaves engage the plug when the leaves are pivoted inwardly to close the passage through the casing, another ring on the exterior of the casing connected to the second ring for rotating the same to pivot the leaves for opening and closing the same, said second ring having tabs extending diametrically outwardly thereof and through the slots in the casing, said tabs being part of the previously mentioned connection, said other ring having recesses engaging the tabs, said casing having a tapered form and being wider at the one end thereof and narrower at the other end, and a filter screen at the narrow other end of the casing extending across the passage therein.

3. A valve structure for controlling flow of liquids or gases therethrough, comprising a casing, open at opposite ends to define a passage therethrough, said casing having circumferential opposed closed slots, first and second flat annular rings disposed in said casing in axial alignment therewith, a plurality of arcuate leaves disposed between the rings in overlapping fashion to form an annular partition, said leaves each having one end thereof pivotally engaged with the first ring, each of the leaves having a slotted other end, said second ring having a plurality first ring being held stationary in the casing while the other ring is rotatable, a spider ring mounted in the casing, said spider ring having a flat annular portion engaged with the casing, a plurality of arms extending radially inward of said flat annular portion, a central plug at the inner ends of the arms, said plug extending axially inward of the casing past the leaves whereby inner edges of the leaves engage the plug when the leaves are pivoted inwardly to close the passage through the casing, another ring on the exterior of the casing connected to the second ring for rotating the same to pivot the leaves for opening and closing the same, said casing and other ring having cooperating scale markings thereon for indicating the size of the passage through the casing defined by the leaves in each position thereof, said second ring having tabs extending diametrically outwardly thereof and through the slots in the casing, said tabs being part of the previously mentioned connection, said other ring having recesses engaging the tabs, said casing having a tapered form and being wider at the one end thereof and narrower at the other end, and a filter screen at the narrow other end of the casing extending across the passage therein.

References Cited in the file of this patent

UNITED STATES PATENTS

| | | |
|---|---|---|
| 1,438,416 | Williams | Dec. 12, 1922 |
| 2,016,998 | Hartke | Oct. 8, 1935 |
| 2,037,663 | Lalor | Apr. 14, 1936 |
| 2,321,336 | Tondreau | June 8, 1943 |
| 2,649,272 | Barbato | Aug. 18, 1953 |
| 2,833,307 | Henderson | May 6, 1958 |
| 2,982,516 | Maienknecht | May 2, 1961 |
| 3,043,558 | Napier | July 10, 1962 |
| 3,073,037 | Fay | Jan. 15, 1963 |

FOREIGN PATENTS

| | | |
|---|---|---|
| 695,170 | France | Sept. 29, 1930 |
| 1,182,007 | France | Jan. 12, 1959 |
| 85,909 | Sweden | Mar. 24, 1936 |
| 344,599 | Switzerland | Mar. 31, 1960 |